(12) United States Patent
Yoshinari et al.

(10) Patent No.: US 9,115,782 B2
(45) Date of Patent: Aug. 25, 2015

(54) BALL BALANCER AND WASHING MACHINE HAVING THE SAME

(71) Applicant: SAMSUNG ELECTRONICS CO., LTD., Suwon-si (KR)

(72) Inventors: Shimada Yoshinari, Osakabu (JP); Ohyagi Atsushi, Osakabu (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/716,778

(22) Filed: Dec. 17, 2012

(65) Prior Publication Data

US 2013/0174690 A1  Jul. 11, 2013

(30) Foreign Application Priority Data

Dec. 16, 2011  (JP) ................................ 2011-0276178

(51) Int. Cl.
| | |
|---|---|
| *F16F 15/14* | (2006.01) |
| *D06F 37/24* | (2006.01) |
| *F16F 15/36* | (2006.01) |

(52) U.S. Cl.
CPC .............. *F16F 15/14* (2013.01); *D06F 37/245* (2013.01); *F16F 15/363* (2013.01); *Y10T 74/2109* (2015.01); *Y10T 74/2128* (2015.01)

(58) Field of Classification Search
CPC ............ Y10T 74/2109; Y10T 74/2121; Y10T 74/2126; F16F 15/363; F16F 15/14; D06F 37/225; D06F 37/245; D06F 37/22; D06F 37/24

USPC .................. 74/572.4, 570.2, 573.13; 68/23.2; 210/144; 720/702; 494/82
IPC ........................................................ D06F 37/24
See application file for complete search history.

(56) References Cited

U.S. PATENT DOCUMENTS 5,806,349 A * 9/1998 Kim et al. ...................... 68/23.2

FOREIGN PATENT DOCUMENTS

| EP | 0811717 | 12/1997 |
|---|---|---|
| EP | 0857807 | 8/1998 |
| JP | 4910563 | 1/1974 |
| JP | 54-120957 | 9/1979 |
| JP | 59-183846 | 10/1984 |

OTHER PUBLICATIONS

Extended European Search Report, dated May 23, 2013, in corresponding European Application No. 12197328.3 (7 pp.).

* cited by examiner

*Primary Examiner* — Thomas Diaz
(74) *Attorney, Agent, or Firm* — Staas & Halsey LLP

(57) ABSTRACT

Disclosed is a ball balancer that increases a rate of balls in ball detention portions and restricts aggravation of unbalance caused by balls outside of the ball detention portions. When a rotation speed of a rotator is less than a first rotation speed, the ball detention portion allows the ball moved from a rolling face to be detained therein and to allow the ball therein to come into contact with the released ball outside thereof to prevent separation of the released ball from the rolling face. Anti-separation portions are provided to come into contact with the released balls outside of the ball detention portions to prevent separation of the released balls from the rolling face. When the rotation speed is greater than the first rotation speed, the ball detention portion allows separation of the ball therein to the rolling face by centrifugal force applied thereto.

14 Claims, 11 Drawing Sheets

BALL BALANCER AND WASHING MACHINE HAVING THE SAME

CROSS-REFERENCE TO RELATED APPLICATIONS

This application claims the benefit of Korean Patent Application No. 2012-0139520, filed on Dec. 4, 2012 in the Korean Intellectual Property Office, and Japanese Patent Application No. 2011-0276178, filed on Dec. 16, 2011, in the Japanese Patent Office, the disclosure of which is incorporated herein by reference.

BACKGROUND

1. Field

Embodiments of the present invention relate to a ball balancer that corrects dislocation between the center of gravity and a rotation center of a rotator.

2. Description of the Related Art

Conventionally, ball balancers have been known as devices to correct unbalance that causes vibration or noise of a rotary system (dislocation between the center of gravity and a rotation center of a rotator). A typical ball balancer includes a doughnut-shaped race member having an empty space therein, and a plurality of balls movably received within the race member. The ball balancer is concentrically installed to a rotator and is rotated, along with the rotator, about a rotation axis of the rotator. If a rotation speed of the rotator exceeds a resonance rotation speed (i.e. a rotation speed causing primary resonance of a rotary system), the balls move away from a weight unbalance portion of the rotator. This enables correction of unbalance. For example, such a ball balancer is installed to a rotating tub of a washing machine to correct unbalance created by bias of clothes within the rotating tub of the washing machine. In addition to the rotating tub of the washing machine, the ball balancer may be installed to a rotator of a rotary machine, such as a centrifuge or a disc drive.

However, if a rotation speed of the rotator is less than a resonance rotation speed, the balls may move toward the weight unbalance portion of the rotator, rather than moving away from the weight unbalance portion. As a result, unbalance is aggravated. As a countermeasure, Japanese Patent Laid-Open publication No. S54-120957 discloses a balance device in which a plurality of recesses (ball detention positions) are formed in the bottom of the balance device and a tilt angle of inner sidewalls of the recesses is determined such that balance weights (balls) are centrifugally rolled out of the recesses when a dehydrator tub is rotated at a higher rotation speed than a natural frequency of a support system for the dehydrator tub. In the balance device disclosed in the aforementioned publication No. S54-120957, if the rotation speed of the dehydrator tub is greater than the natural frequency, the balance weights are centrifugally separated from the recesses and move to the top of the balance device. If the rotation speed of the dehydrator tub is less than the natural frequency, the balance weights are detained in the recesses, which may restrict aggravation of unbalance.

Japanese Patent Laid-Open publication No. S49-10563 discloses a dehydration/washing machine in which a weight guiding pipe installed to a wash tub is internally provided with a slope, and a weight (ball) is detained in a gap (ball detention position) between the slope and a sidewall opposite to the slope when the wash tub is rotated less than a resonance rotation speed, but centrifugally moves upward along the slope when the wash tub reaches the resonance rotation speed. Also, Japanese Patent Laid-Open publication No. S59-183846 discloses a balancer in which an annular chamber receives liquid and spheres (balls) arranged in the bottom (at ball detention positions) thereof such that the spheres centrifugally move upward from the bottom of the annular chamber along an inclined wall of the annular chamber when a rotating tub is rotated at a higher speed than a resonance point.

However, in the related art, although balls begin to move toward ball detention positions by gravitational force if a rotation speed of a rotator becomes less than a resonance rotation speed (revolutions per minute that cause primary resonance of a rotary system), there is a likelihood that some balls not present at the ball detention positions come into contact with other balls present at the ball detention positions and remain stationary without moving to the ball detention positions. In this case, since gravitational force is applied to the balls not present at the ball detention positions, it may be difficult to move the balls to the ball detention positions. For example, although the aforementioned publication No. S54-120957 describes movement of the balls via vibration of the dehydrator tub, moving the balls not present at the ball detention positions may be impossible because gravitational force applied to the balls is greater than force generated by vibration of the dehydrator tub (i.e. force to move the balls in a peripheral direction of a race member). As such, distributing the balls not present at the ball detention positions in the peripheral direction may be impossible, and therefore increasing a rate of the balls at the ball detention positions may be impossible. This makes it difficult to restrict aggravation of unbalance due to the balls not present at the ball detention positions.

SUMMARY

It is an aspect of the present invention to provide a ball balancer that may increase a rate of balls present at ball detention positions and restrict aggravation of unbalance caused by balls not present at the ball detention positions.

Additional aspects of the invention will be set forth in part in the description which follows and, in part, will be obvious from the description, or may be learned by practice of the invention.

In accordance with one aspect of the invention, a ball balancer installed to a rotator that is rotatable about a rotation axis, includes a doughnut-shaped race member having an empty space therein, and a plurality of balls movably received in the empty space of the race member, wherein the empty space of the race member is defined by inner and outer peripheral walls in the form of a circular pipe about the rotation axis, and doughnut-shaped bottom and top walls connecting upper and lower ends of the inner and outer peripheral walls to each other, wherein an inner surface of the bottom wall is configured by an inner peripheral edge portion connected to the inner peripheral wall and a rolling face connecting the inner peripheral edge portion and the outer peripheral wall to each other, wherein the inner peripheral edge portion of the inner surface of the bottom wall is provided with a plurality of ball detention portions spaced apart from one another by a predetermined distance in a peripheral direction of the race member and a plurality of anti-separation portions respectively arranged between the plurality of ball detention portions, wherein the rolling face is inclined upward from the inner peripheral edge portion of the inner surface of the bottom wall to the outer peripheral wall to allow the balls to move to the outer peripheral wall by centrifugal force applied to the balls when a rotation speed of the rotator is greater than a second rotation speed that is less than a first rotation speed causing primary resonance, wherein each of the ball detention portions is configured, when the rotation speed of the rotator is less than the first rotation speed, to allow one of the balls moved from the rolling face to the ball detention portion to be detained in the ball detention portion and to allow the detained ball in the ball detention portion to come into contact with a released one of the balls outside of the ball detention portion so as to prevent separation of the released ball from the rolling face, and is also configured, when the rotation speed of the rotator is greater than the first rotation speed, to allow the detained ball in the ball detention portion to be separated to the rolling face by centrifugal force applied to the detained ball, and wherein each of the plurality of anti-separation portions is configured to come into contact with the released ball outside of the ball detention portion when the rotation speed of the rotator is less than the first rotation speed, so as to prevent separation of the released ball from the rolling face.

When a rotation speed of the rotator is less than the first rotation speed, the released balls outside of the ball detention portions may be placed on the rolling face. Thereby, the released balls may move on the rolling face by centrifugal force and gravitational force applied to the released balls as the rotation speed of the rotator varies within a range less than the first rotation speed. Therefore, distribution of the released balls in a peripheral direction of the race member may be possible. Accordingly, the balls outside of the ball detention portions (the released balls) may easily move to the ball detention portions in which no balls are detained, which may increase a detention rate of the balls in the ball detention portions. As a result, aggravation of unbalance due to the released balls may be reduced.

The plurality of ball detention portions may be respectively configured by a plurality of recesses.

A radial outer side surface of each of the plurality of recesses may be inclined upward from the bottom of the recess to an inner peripheral edge of the rolling face by a steeper angle than the rolling face, to allow the ball in the recess to move on the radial outer side surface of the recess and be separated to the rolling face by centrifugal force applied to the ball when the rotation speed of the rotator is greater than the first rotation speed, and a depth of each of the plurality of recesses may be determined to ensure that the released ball outside of the recess comes into contact with both the rolling face and the detained ball in the recess. With this configuration, when the rotation speed of the rotator is less than the first rotation speed, the ball moved from the rolling face into the recess may be detained in the recess. When the rotation speed of the rotator is greater than the first rotation speed, the ball detained in the recess may be separated to the rolling face by centrifugal force applied to the detained ball. Moreover, when the rotation speed of the rotator is less than the first rotation speed, the detained ball may come into contact with the released ball to prevent separation of the released ball from the rolling face.

The depth of each of the plurality of recesses may be determined to ensure that an upper end of the detained ball in the recess protrudes from the recess and the released ball outside of the recess comes into contact with the detained ball at a position higher than an upper end of the recess. With this configuration, the released ball may come into contact with both the rolling face and the detained ball.

The plurality of anti-separation portions may be respectively configured by a plurality of protrusions.

Each of the plurality of protrusions may be configured to allow the released ball to come into contact with both the rolling face and a radial outer side surface of the protrusion. With this configuration, when the rotation speed of the rotator is less than the first rotation speed, the released ball may come into contact with the radial outer side surface of the protrusion to prevent separation of the released ball from the rolling face.

A radial distance from the inner peripheral edge of the rolling face to the radial outer side surface of each of the plurality of protrusions may be less than a radius of the ball. With this configuration, the released ball may come into contact with both the rolling face and the radial outer side surface of the protrusion.

Each of the plurality of protrusions may be configured to allow the released ball to come into contact with a portion of the radial outer side surface of the protrusion except for the edge thereof. With this configuration, rolling resistance of the released balls may be reduced. Thereby, the released balls may be easily distributed in the peripheral direction of the race member, resulting in an increased detention rate of the balls.

A width of the radial outer side surface of each of the plurality of protrusions with respect to the rotation axis may be greater than the radius of the ball. With this configuration, the released ball may come into contact with a portion of the radial outer side surface of the protrusion except for the edge thereof.

The rotator may be switchable between a high-speed rotation mode in which the rotator is rotated at a rotation speed greater than the first rotation speed and a variable-speed rotation mode in which the rotation speed varies within a range less than the first rotation speed. With this configuration, the balls may move by centrifugal force and gravitational force applied thereto in the variable-speed rotation mode.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
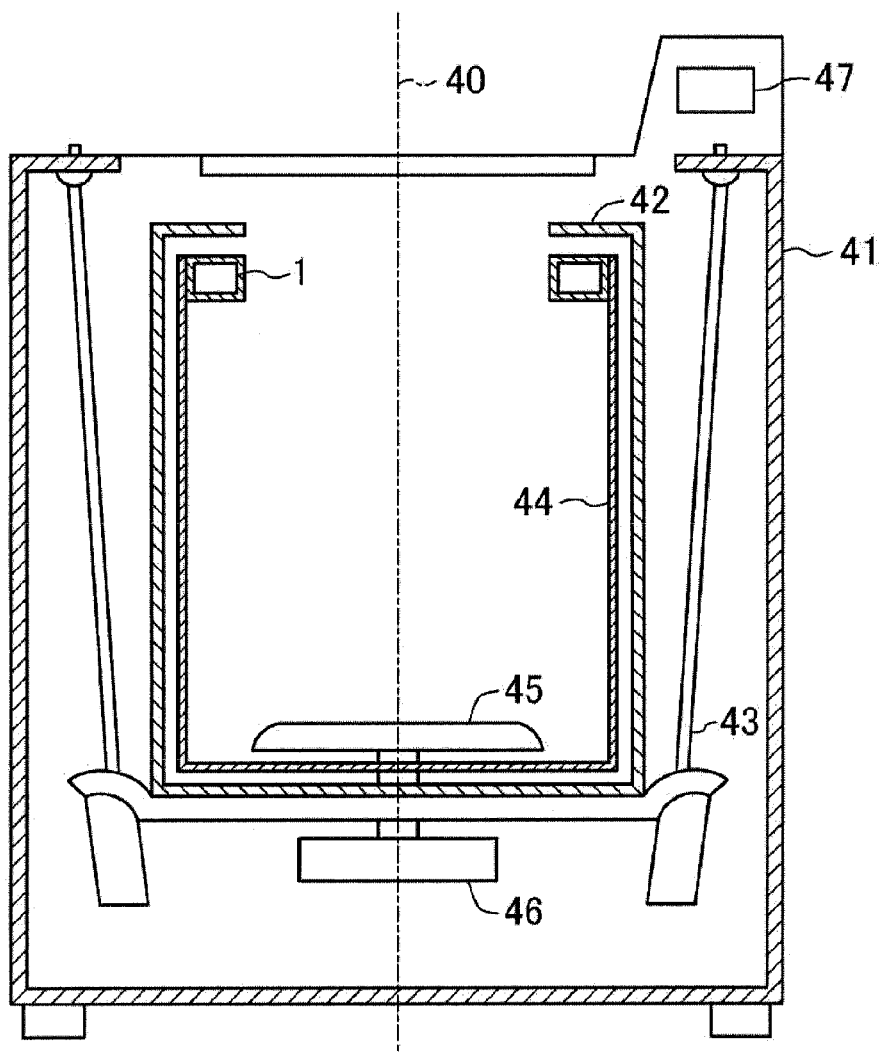
FIG. 1 is a sectional view illustrating a configuration of a washing machine having a ball balancer.

Reference will now be made in detail to the embodiments of the present invention, examples of which are illustrated in the accompanying drawings, wherein like reference numerals refer to like elements throughout. A repeated description of the like elements will be omitted.

(Washing Machine)

FIG. 1 illustrates a configuration of a washing machine to which a ball balancer is installed. The washing machine includes a ball balancer 1, an outer case 41, an outer tub 42, an elastic suspension structure 43, a rotating tub 44, an agitator blade 45, a motor 46, and a control device 47. The outer tub 42 is placed within the outer case 41 and is supported by the elastic suspension structure 43. The rotating tub 44 is placed within the outer tub 42. The rotating tub 44 is a rotator that is rotatable about a rotation axis 40. The ball balancer 1 is concentrically installed to the rotating tub 44 about the rotation axis 40 of the rotating tub 44. When the rotating tub 44 is rotated, the ball balancer 1 is rotated about the rotation axis 40. The agitator blade 45 is placed within the rotating tub 44. The motor 46 is mounted to a lower surface of the outer tub 42. The motor 46 rotates the rotating tub 44 and the agitator blade 45 in response to control by the control device 47. The control device 47 executes, e.g., management of operation processes of the washing machine, or control of a rotation speed of the motor 46. Additionally, the ball balancer 1 may be mounted to an upper end of the rotating tub 44, or may be mounted to a central portion or a lower end of the rotating tub 44. As necessary, a plurality of ball balancers may be mounted to the rotating tub 44.

Figure 2:
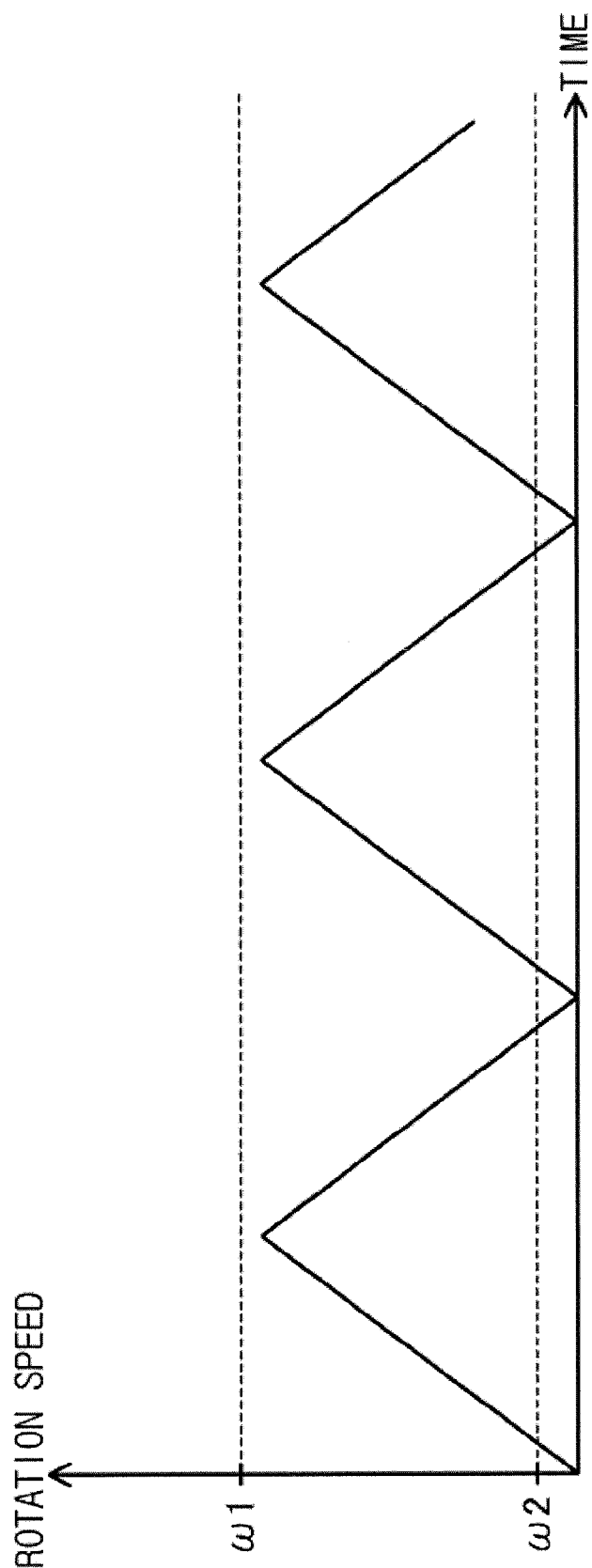
FIG. 2 is a graph explaining control of a rotation speed.

For example, the control device 47 controls operation of the washing machine in the sequence of water supply, washing, intermediate dehydration, rinsing, and final dehydration processes. During the washing and rinsing processes, the control device 47 controls the motor 46 to rotate the agitator blade 45 while keeping the rotating tub 44 stationary. During the water supply and dehydration processes (including the intermediate dehydration process and the final dehydration process), the control device 47 controls the motor 46 to rotate both the agitator blade 45 and the rotating tub 44. In the present embodiment, the rotating tub 44 is controlled to be rotated at a rotation speed greater than a rotation speed ω1 at which primary resonance of a rotary system occurs during the intermediate dehydration process and the final dehydration process, and is controlled such that a rotation speed thereof varies as illustrated in FIG. 2 during the water supply process. Explaining this in more detail, the rotation speed of the rotating tub 44 varies within a range less than the rotation speed ω1 during the water supply process. That is, the rotating tub 44 may be switched between a high-speed rotation mode in which the rotating tub 44 is rotated at a rotation speed greater than the rotation speed ω1 and a variable-speed rotation mode in which the rotation speed varies within a range less than the rotation speed ω1.

The control device 47 may control the rotating tub 44 to be operated in a variable-speed rotation mode immediately before the dehydration process, may control the rotating tub 44 to be operated in a variable-speed rotation mode immediately after the dehydration process, and may control the rotating tub 44 to be operated in a variable-speed rotation mode after the rotating tub 44 is operated in a high-speed rotation mode during the dehydration process. A lower limit of a rotation variable speed range of the rotating tub 44, as illustrated in FIG. 2, may be "zero", or may be a rotation speed greater than zero and less than the rotation speed ω1. That is, the rotating tub 44 may be continuously rotated without stopping in the variable-speed rotation mode.

(Ball Balancer)

Figure 3:
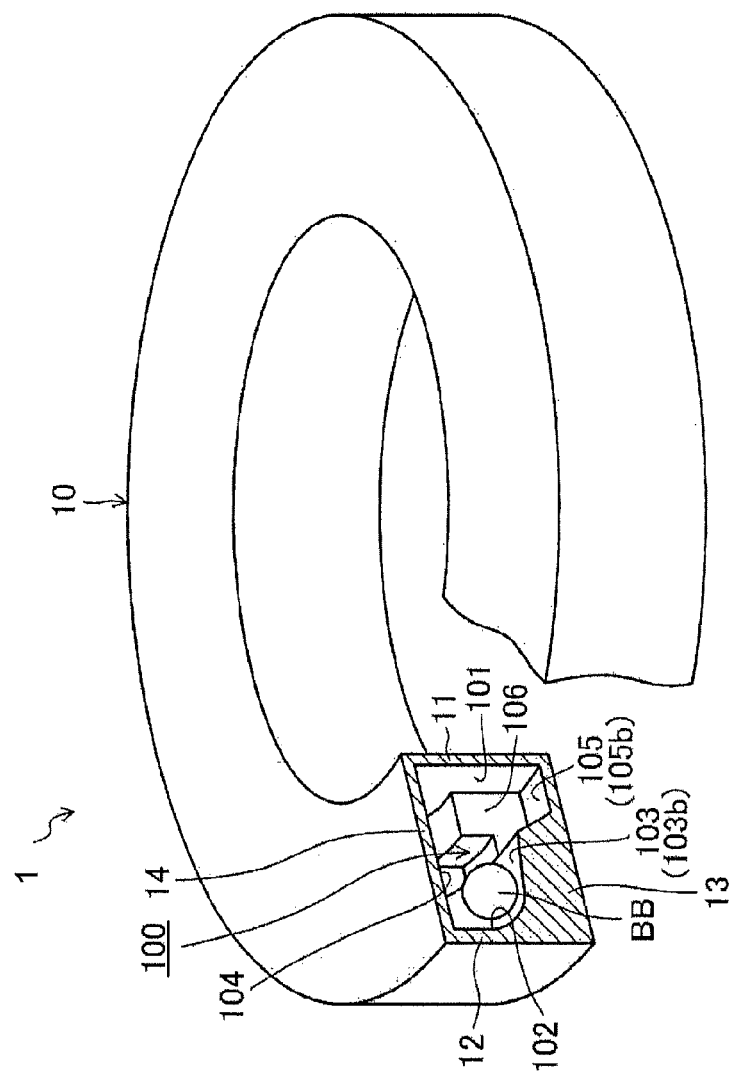
FIG. 3 is a schematic view illustrating a configuration of a ball balancer.

FIG. 3 illustrates a schematic configuration of the ball balancer 1. The ball balancer 1 includes a doughnut-shaped race member 10 having an empty space therein, and a plurality of balls BB rotatably received in the empty space 100 of the race member 10. The empty space 100 of the race member 10 is defined by inner and outer peripheral walls 11 and 12 in the form of a circular pipe about a rotation axis, and bottom and top walls 13 and 14 connecting upper and lower ends of the inner and outer peripheral walls 11 and 12 to each other. More specifically, the empty space 100 is surrounded by an inner surface 101 of the inner peripheral wall 11, an inner surface 102 of the outer peripheral wall 12, an inner surface 103 of the bottom wall 13, and an inner surface 104 of the top wall 14. Oil as well as the plurality of balls BB may be received in the empty space 100.

Figure 4:
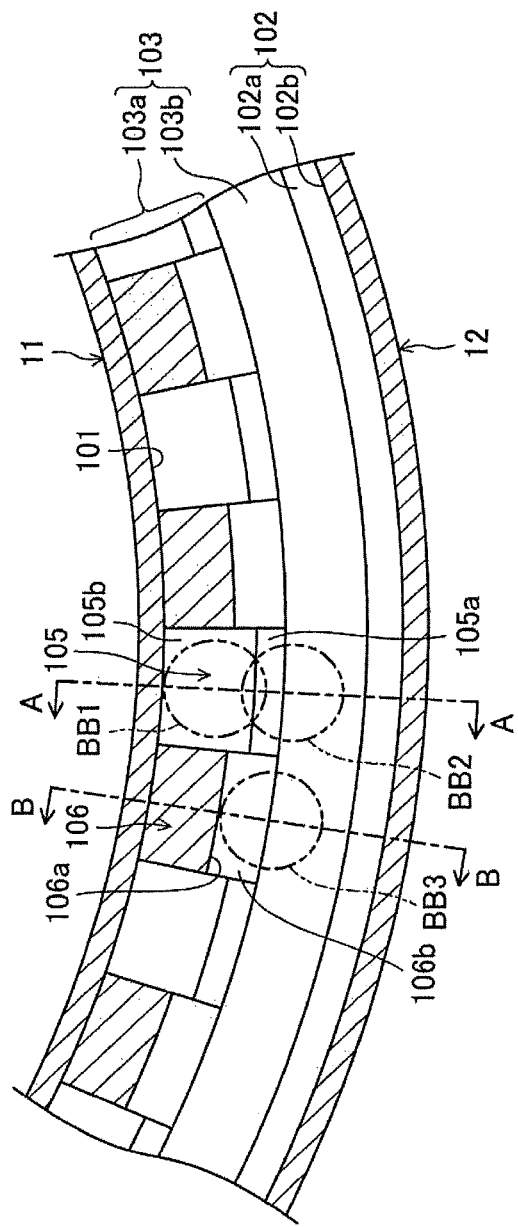
FIG. 4 is a fragmentary plan view illustrating a configuration of the ball balancer.

Referring to FIGS. 4, 5(A) and 5(B), an exemplary configuration of the ball balancer 1 will be described in detail. FIG. 4 illustrates a portion of the race member 10, and FIGS. 5(A) and 5(B) illustrate cross sections taken along lines A-A and B-B of the race member 10 illustrated in FIG. 4. The ball balancer 1 has configurations as follows throughout the periphery of the race member 10.

[Bottom Wall]

The inner surface 103 of the bottom wall 13 is configured by an inner peripheral edge portion 103a connected to the inner peripheral wall 11 and a rolling face 103b connecting the inner peripheral edge portion 103a and the outer peripheral wall 12 to each other. A plurality of recesses 105 (a plurality of ball detention portions) and a plurality of protrusions 106 (a plurality of anti-separation portions) are formed at the inner peripheral edge portion 103a of the inner surface 103 of the bottom wall 13.

<Rolling Face>

In the inner surface 103 of the bottom wall 13, the rolling face 103b is inclined upward from the inner peripheral edge portion 103a to the outer peripheral wall 12, to ensure that the balls BB move toward the outer peripheral wall 12 by centrifugal force applied to the balls BB when a rotation speed of the rotator is greater than a rotation speed ω2 (less than the rotation speed ω1). When viewed from the top of the race member 10, the inner peripheral edge portion 103a and the rolling face 103b define a doughnut (more particularly, a doughnut about a rotation axis).

<Recess>

The recesses 105 are spaced apart from one another by a predetermined distance in a peripheral direction of the race member 10. The recesses 105 have the same shape. The recesses 105 are configured to detain the balls BB moved from the rolling face 103b when a rotation speed of the rotator is less than the rotation speed ω1 (or is equal to the rotation speed ω1). The recesses 105 are also configured to ensure that the balls BB in the recesses 105 (hereinafter referred to as detained balls BB1) come into contact with the other balls BB outside of the recesses 105 (hereinafter referred to as released balls BB2), thereby preventing separation of the released balls BB2 from the rolling face 103b. Moreover, the recesses 105 are configured to assist the balls BB in the recesses 105 (the detained balls BB1) in moving to the rolling face 103b by centrifugal force applied thereto when a rotation speed of the rotator is greater than the rotation speed ω1.

<<Radial Outer Side Surface of Recess>>

A radial outer side surface 105a of the recess 105 (hereinafter referred to as a recess side surface 105a) may be inclined upward from the bottom of the recess 105 (hereinafter referred to as a recess bottom surface 105b) to an inner peripheral edge of the rolling face 103b by a steeper angle than the rolling face 103b, to allow the ball BB in the recess 105 (the detained ball BB1) to move on the recess side surface 105a and be discharged to the rolling face 103b by centrifugal force applied to the detained ball BB1 when a rotation speed of the rotator is greater than the rotation speed ω1. With this configuration, the ball BB moved from the rolling face 103b to the recess 105 may be detained in the recess 105 when a rotation speed of the rotator is less than the rotation speed ω 1, and the detained ball BB1 may move to the rolling face 103 by centrifugal force applied thereto when a rotation speed of the rotator is greater than the rotation speed ω 1.

<<Depth of Recess>>

A depth of the recess 105 may be determined to ensure that the released ball BB2 in contact with the rolling face 103b comes into contact with the detained ball BB1 in the recess 105. With this configuration, when a rotation speed of the rotator is less than the rotation speed ω 1, the detained ball BB1 comes into contact with the released ball BB2, which may prevent separation of the released ball BB2 from the rolling face 103b.

More particularly, the depth of the recess 105 may be determined to ensure that an upper end of the detained ball BB1 protrudes from the recess 105 and the released ball BB2 comes into contact with the detained ball BB1 at a position higher than an upper end of the recess 105. With this configuration, the released ball BB2 may come into contact with both the rolling face 103b and the detained ball BB1.

When viewed from the top of the race member 10, the recess 105 has an approximately square shape. A radial inner side surface of the recess 105 is connected to the inner surface 101 of the inner peripheral wall 11. That is, the radial inner side surface of the recess 105 is defined by the inner surface 101 of the inner peripheral wall 11. Also, when viewed from the top of the race member 10, outer peripheral edges of the recess side surface 105a and the recess bottom surface 105b may be arc-shaped (more particularly, may take the form of an arc about a rotation axis).

<<Protrusion>>

The plurality of protrusions 106 are respectively arranged between the plurality of recesses 105. The plurality of protrusions 106 may have the same shape. When a rotation speed of the rotator is less than the rotation speed ω 1 (or is equal to the rotation speed ω 1), the protrusions 106 come into contact with the balls BB outside of the recesses 105 (the released balls BB3), thereby preventing separation of the released balls BB3 from the rolling face 103b.

<<Radial Width of Protrusion>>

The protrusion 106 may be configured to assist the released ball BB3 in coming into contact with the rolling face 103b and a radial outer side surface 106a of the protrusion 106 (hereinafter, referred to as a protrusion side surface 106a). With this configuration, when a rotation speed of the rotator is less than the rotation speed ω 1, the released ball BB3 comes into contact with the protrusion side surface 106a, which may prevent separation of the released ball BB3 from the rolling face 103b.

More particularly, a radial distance from the inner peripheral edge of the rolling face 103b to the protrusion side surface 106a (a radial length of the race member 10 or a horizontal distance in FIGS. 5A and 5B) may be less than a radius of the ball BB. With this configuration, the released ball BB3 may come into contact with both the rolling face 103b and the protrusion side surface 106a.

<<Width of Protrusion in Direction of Rotation Axis>

The protrusion 106 may be configured such that the released ball BB3 comes into contact with a portion of the protrusion side surface 106a except for the edge thereof. With this configuration, the edge of the protrusion side surface 106a (i.e. corners of the protrusion 106) may not come into contact with the released ball BB3.

More particularly, a width of the protrusion side surface 106a in a direction of the rotation axis (i.e. a width measured along the rotation axis 40 or a vertical distance in FIGS. 5A and 5B) may be greater than a radius of the ball BB. With this configuration, the released ball BB3 may come into contact with a portion of the protrusion side surface 106a except for the edge thereof.

When viewed from the top of the race member 10, the protrusion 106 has an approximately square shape. A flat plane 106b is formed between the protrusion side surface 106a and the inner peripheral edge of the rolling face 103b. The flat plane 106b is parallel to a rotational plane perpendicular to the rotation axis. The radial inner side surface of the protrusion 106 is connected to the inner surface 101 of the inner peripheral wall 11, and both peripheral surfaces of the protrusion 106 have the same plane as peripheral surfaces of the adjacent recesses 105. The protrusion side surface 106a may have an arc shape (more particularly, may take the form of an arc about the rotation axis) when viewed from the top of the race member 10.

[Inner Peripheral Wall and Outer Peripheral Wall]

The inner surface 101 of the inner peripheral wall 11 may be perpendicular to (or approximately perpendicular to) the rotational plane perpendicular to the rotation axis. The inner surface 102 of the outer peripheral wall 12 is defined by a lower end surface 102a connected to an outer peripheral edge of the rolling face 103b and an upper end surface 102b connected to the lower end surface 102a. The lower end surface 102a is an arcuate curved surface. That is, the lower end surface 102a has a curved peripheral cross section, a tilt angle (relative to the rotational plane perpendicular to the rotation axis) of which increases from the outer peripheral edge of the rolling face 103b to the upper end surface 102b. The upper end surface 102b is perpendicular (or substantially perpendicular) to the rotational plane perpendicular to the rotation axis.

[Shape of Recess and Protrusion]

Figure 6:
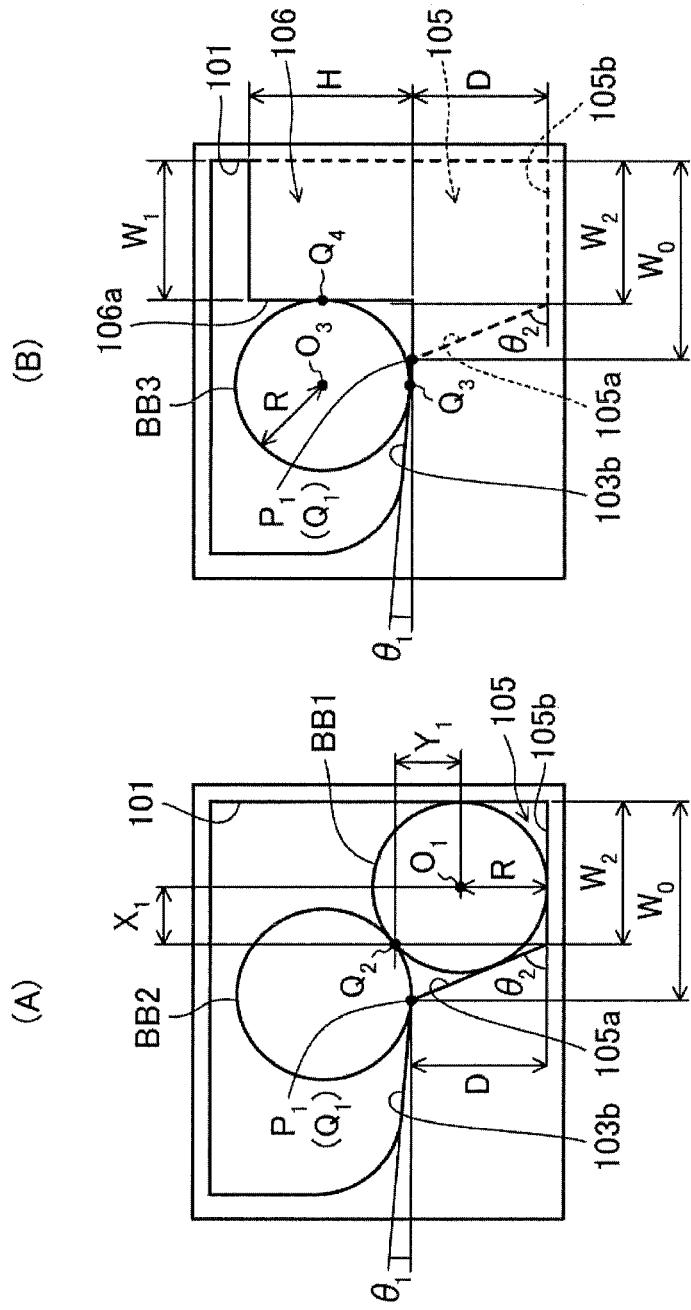
FIG. 6 is a sectional view explaining concrete examples of shapes of recesses and protrusions.

Referring to FIGS. 6(A) and 6(B), concrete examples of shapes of the recess 105 and the protrusion 106 will now be described. The ball BB in the recess 105 (the detained ball BB1) comes into contact with the recess side surface 105a, the recess bottom surface 105b, and the inner surface 101 of the inner peripheral wall 11. Comparing tilt angles relative to the rotational plane perpendicular to the rotation axis, a tilt angle θ 2 of the recess side surface 105a is greater than a tilt angle θ 1 of the rolling face 103b. In the following description, 'R' refers to a radius of the ball BB, '$W_0$' refers to a radial width of an open end of the recess 105, '$W_1$' refers to a radial width of the protrusion 106, '$W_2$' refers to a radial width of the recess bottom surface 105b, 'D' refers to a depth of the recess 105, 'H' refers to a height of the protrusion 106, '$X_1$' refers to a distance to a ball contact point $Q_2$, and '$Y_1$' refers to a height to the ball contact point $Q_2$. These symbols will be described as follows.

The radial width $W_0$ of the open end of the recess 105 represents a radial distance (i.e. a horizontal distance in FIGS. 6(A) and 6(B)) from a connection between the recess side surface 105a and the rolling face 103b (i.e. the inner peripheral edge of the rolling face 103b or a junction point $P_1$ in FIGS. 6(A) and 6(B)) to the inner surface 101 of the inner peripheral wall 11. The depth D of the recess 105 represents a direction distance from the recess bottom surface 105b to the junction point $P_1$ (i.e. a vertical distance in FIGS. 6(A) and 6(B)) with respect to the rotation axis.

The radial width $W_1$ of the protrusion 106 represents a radial distance from the protrusion side surface 106a to the inner surface 101 of the inner peripheral wall 11. The height H of the protrusion 106 represents a width of the radial outer side surface 106a of the protrusion 106 (a vertical width in FIGS. 6(A) and 6(B)) with respect to the rotation axis.

The distance $X_1$ to the ball contact point represents a radial distance from a center point $O_1$ of the ball BB1 to a contact point $Q_2$ between the ball BB1 and the ball BB2. The height Y1 to the ball contact point represents a distance from the center point $Q_1$ of the ball BB1 in the recess 105 to the contact point $O_2$ with respect to the rotation axis.

<Radial Width of Protrusion>

The radial width $W_1$ of the protrusion 106 may be determined to satisfy the following Equation 1.

$$W_1 > W_0 - R \quad \text{Equation 1}$$

Here, the radial width $W_0$ of the open end of the recess 105 may be represented by the following Equation 2.

$$W_0 = W_2 + D \tan(90° - \theta_2) \quad \text{Equation 2}$$

When substituting Equation 2 into Equation 1, the radial width $W_1$ of the protrusion is calculated by the following Equation 3.

$$W_1 > W_2 + D \tan(90° - \theta_2) - R \quad \text{Equation 3}$$

With this configuration, a center point $Q_3$ of the released ball BB3 may be located radially outward of the junction point $P_1$, and the contact point $Q_3$ of the released ball BB3 may be located on the rolling face 103b. That is, the released ball BB3 may remain stationary by coming into contact with both the rolling face 103b and the protrusion 106.

<Height of Protrusion>

The height H of the protrusion 106 may be determined to satisfy the following Equation 4.

$$H > R \quad \text{Equation 4}$$

With this configuration, a contact point $Q_4$ of the released ball BB3 may be located on a portion of the protrusion side surface 106a except for the edge thereof (corners of the protrusion 106). That is, the released ball BB3 may come into contact with the portion of the protrusion side surface 106a except for the edge thereof (corners of the protrusion 106).

<Depth of Recess>

The depth D of the recess 105 may be determined to satisfy the following Equation 5.

$$D < R + Y_1 \quad \text{Equation 5}$$

The following Equation 6 is established between the distance $X_1$ to the ball contact point and the height $Y_1$ to the ball contact point.

$$D_1^2 + Y_1^2 = R^2 \rightarrow Y_1^2 = R^2 - X_1^2 \quad \text{Equation 6}$$

Here, the distance $X_1$ to the ball contact point may be represented by the following Equation 7.

$$X_1 + R = W_2 \rightarrow X_1 = W_2 - R \quad \text{Equation 7}$$

When substituting Equation 7 into Equation 6, the height $Y_1$ to the ball contact point may be represented by the following Equation 8.

$$Y_1^2 = R^2 - (W_2 - R)^2 \rightarrow Y_1 = \sqrt{-W_2^2 + 2RW_2} \quad \text{Equation 8}$$

When substituting Equation 8 into Equation 5, the depth D of the recess 105 may be represented by the following Equation 9.

$$D < R + \sqrt{-W_2^2 + 2RW_2} \quad \text{Equation 9}$$

With this configuration, with respect to the rotation axis, an upper end of the detained ball BB1 may be located higher than the junction point $P_1$, and the contact point $P_2$ between the detained ball BB1 and the released ball BB2 may be located higher than the junction point $P_1$. Thereby, the contact point $Q_1$ of the released ball BB2 may be located on the rolling face 103b. That is, as the upper end of the detained ball BB1 protrudes from the recess 105 and the released ball BB2 comes into contact with the detained ball BB1 at a position higher than the upper end of the recess 105, the released ball BB2 may remain stationary while coming into contact with the rolling face 103b.

[Operation]

Next, operation of the ball balancer 1 will be described with reference to FIGS. 7 to 9. It is assumed that a rotation speed of the rotator varies as illustrated in FIG. 2. Here, three balls BB4, BB5 and BB6 will be explained by way of example.

Figure 7:
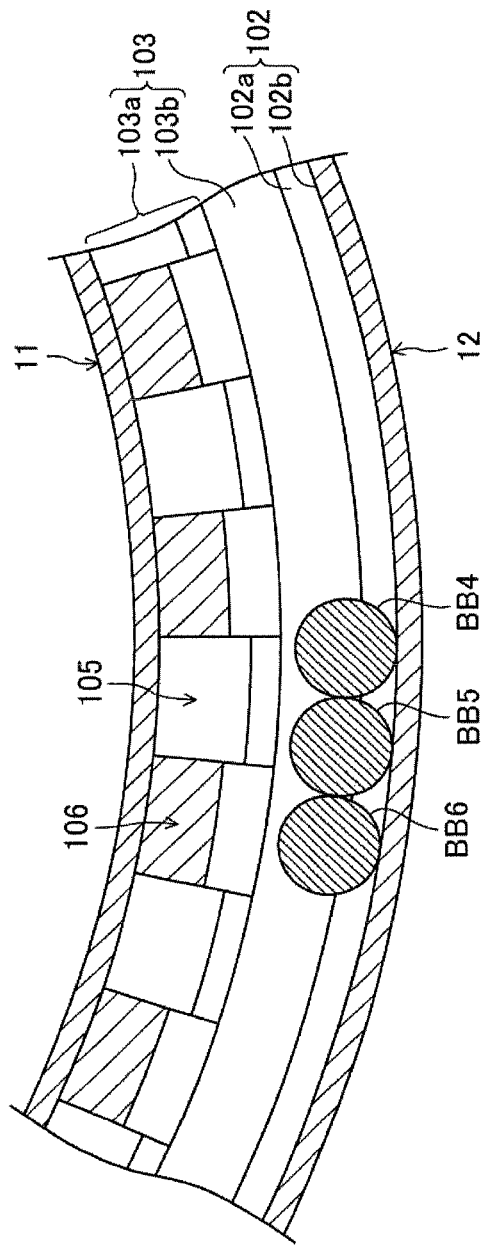
FIG. 7 is a plan view explaining operation of the ball balancer.

If a rotation speed of the rotator is greater than the rotation speed $\omega$ 1, as illustrated in FIG. 7, the balls BB4, BB5 and BB6 come into contact with the inner surface 102 of the outer peripheral wall 12 by centrifugal force applied to the balls BB4, BB5 and BB6.

Subsequently, if the rotation speed of the rotator decreases and becomes less than the rotation speed $\omega$ 1, the balls BB4, BB5 and BB6 move on the rolling face 103b to the inner peripheral edge 103a of the inner surface 103 by gravitational force applied to the balls BB4, BB5 and BB6 as a rotation speed of the rotator is reduced. Through variation in the rotation speed of the rotator, the balls BB4, BB5 and BB6 are forced to move in a peripheral direction of the race member 10. Thereby, the balls BB4, BB5 and BB6 move downward on the rolling face 103b toward the inner peripheral edge 103a of the inner surface 103 of the bottom wall 13 in a peripheral direction of the race member 10.

Figure 8:
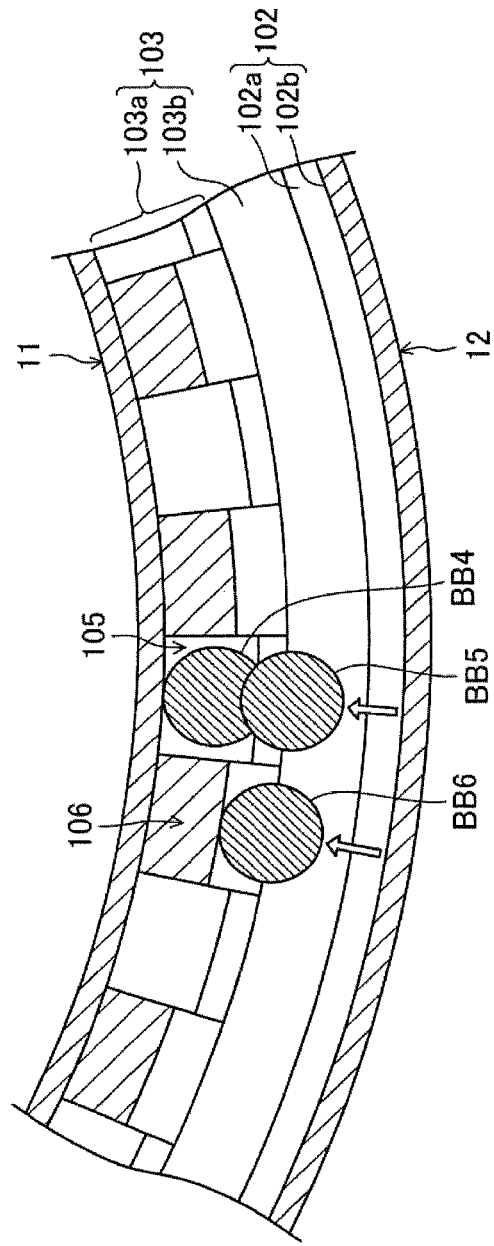
FIG. 8 is a plan view explaining operation of the ball balancer.
Figure 9:
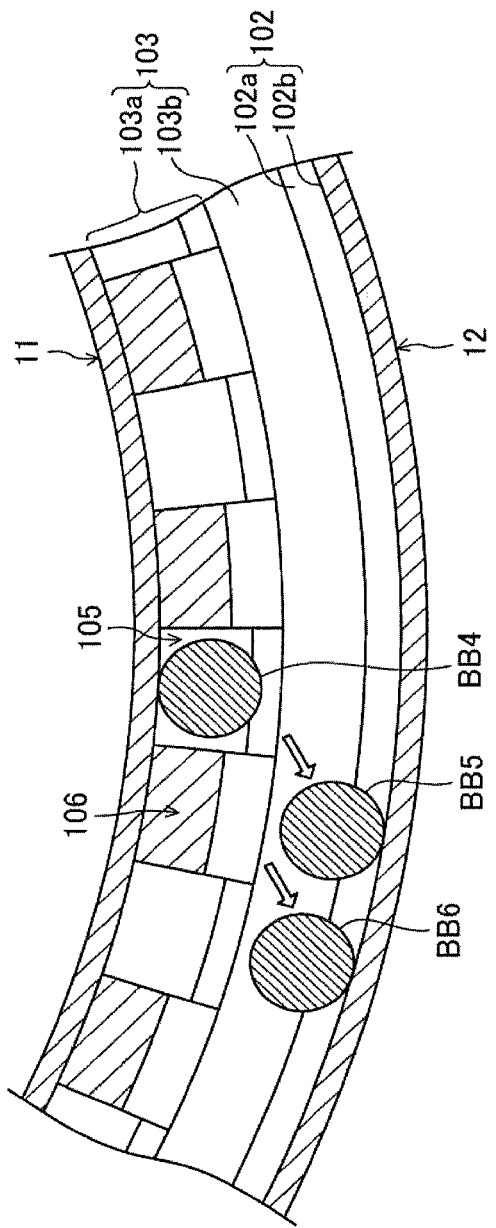
FIG. 9 is a plan view explaining operation of the ball balancer.

Subsequently, if the rotation speed of the rotator decreases and becomes less than the rotation speed $\omega$ 2, as illustrated in FIG. 8, the ball BB4 reaches the recess 105 and remains stationary in the recess 105. Although the ball BB5 also moves to the recess 105, the recess 105 is already occupied by the ball BB4. Thus, the ball BB5 comes into contact with the ball BB4 in the recess 105 and remains stationary on the rolling face 103b. Also, as the ball BB6 moves to the protrusion 106, the ball BB6 comes into contact with the protrusion 106 and remains stationary on the rolling face 103b.

Subsequently, if the rotation speed of the rotator increases and exceeds the rotation speed $\omega$ 2, the balls BB5 and BB6 move on the rolling face 103b to the outer peripheral edge of the rolling face 103b by centrifugal force applied to the balls BB4, BB5 and BB6 as a rotation speed of the rotator increases. Even in this case, through variation in the rotation speed of the rotator, the balls BB5 and BB6 are forced to move in a peripheral direction of the race member 10. Thereby, as illustrated in FIG. 9, the balls BB5 and BB6 move upward on the rolling face 103b toward the outer peripheral edge of the inner surface 103 of the bottom wall 13 in a peripheral direction of the race member 10. The ball BB4, which is detained in the recess 105, does not move despite the increased rotation speed of the rotator.

Iteration of the aforementioned operation causes the balls BB to be distributed in a peripheral direction of the race member 10 and be detained in the respective recesses 105.

[Centrifugal Force and Gravitational Force]

Figure 10:
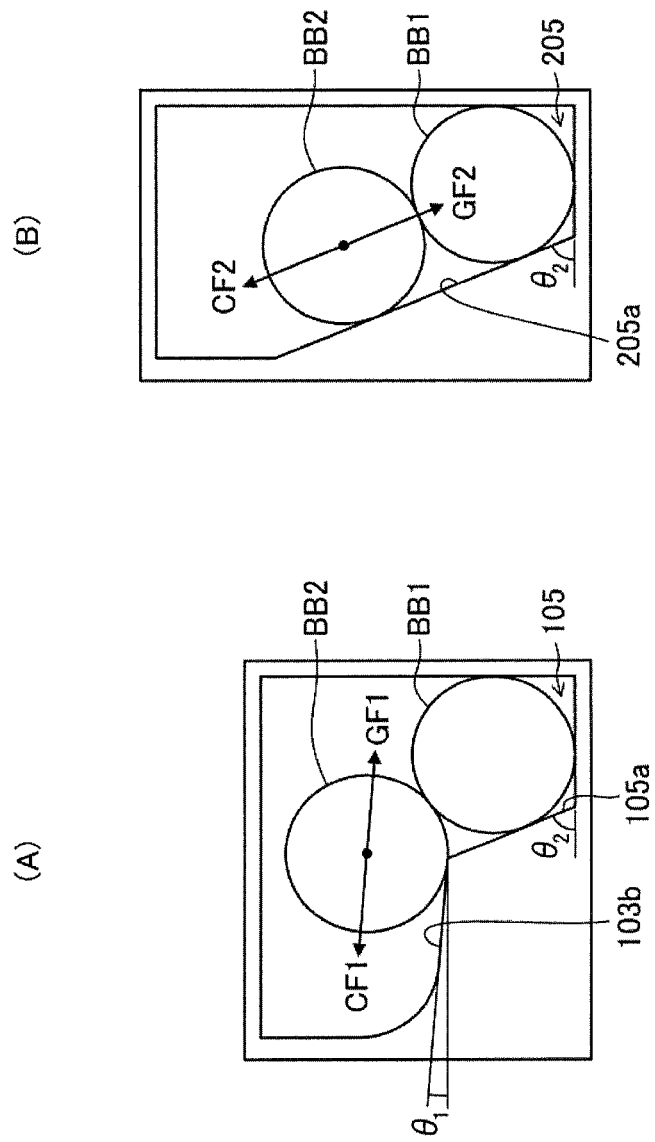
FIG. 10 is a sectional view explaining centrifugal force and gravitational force applied to balls.

Next, centrifugal force and gravitational force applied to the balls BB will be described with reference to FIGS. 10(A) and 10(B). FIG. 10A illustrates a case in which the ball BB2, which comes into contact with the rolling face 103b having a tilt angle $\theta_1$, remains stationary by coming into contact with the ball BB1 which is detained in the recess 105. FIG. 10B illustrates a case in which the ball BB2, which comes into contact with a slope 205a having a tilt angle $\theta_2$, remains stationary by coming into contact with the ball BB1 which is detained in the recess 105. The tilt angle $\theta$ is less than the tilt angle $\theta_2$.

In the following description,
'm' refers to a mass of the ball BB2,
'R' refers to a radius of the ball BB,
'ω' refers to a rotation speed of the rotator,
'g' refers to a gravitational acceleration, and
'θ' refers to a tilt angle of a slope that comes into contact with the ball BB2. For convenience of description, all centrifugal force CF1 and CF2 applied to the ball BB2 is designated by "centrifugal force CF", and all gravitational force GF1 and GF2 applied to the ball BB2 is designated by "gravitational force GF".

The centrifugal force CF applied to the ball BB2 may be represented by the following Equation 10.

$$CF = mR\omega^2 \cos\theta \qquad \text{Equation 10}$$

The gravitational force GF applied to the ball BB2 may be represented by the following Equation 11.

$$GF = mg \sin\theta \qquad \text{Equation 11}$$

A condition when the ball BB2 is moved upward on a slope (the rolling face 103b or the slope 205a) against gravitational force may be represented by the following Equation 12.

$$mR\omega^2 \cos\theta > mg \sin\theta \qquad \text{Equation 12}$$

Here, the gravitational force GF1 is less than the gravitational force GF2 because the tilt angle $\theta_1$ of the rolling face 103a is less than the tilt angle $\theta_2$ of the slope 205a. That is, in the case in which the ball BB2 is stationary in contact with the rolling face 103b as illustrated in FIG. 10(A), the ball BB2 may more easily move upward against gravitational force than in the case in which the ball BB2 is stationary in contact with the slope 205a as illustrated in FIG. 10(B).

As derived from Equation 12, a rotation speed ω required for the ball BB2 to move upward on the slope against the gravitational force may be represented by the following Equation 13.

$$\omega > \sqrt{\frac{g}{R}\tan\theta} \qquad \text{Equation 13}$$

It will be appreciated from Equation 13 that in the case in which the ball BB2 is stationary in contact with the rolling face 103b as illustrated in FIG. 10(A), the rotation speed ω required for the ball BB2 to move upward against the gravitational force may be lower than in the case in which the ball BB2 is stationary in contact with the slope 205a as illustrated in FIG. 10(B).

[Effects]

As described above, when a rotation speed of the rotator is less than the rotation speed ω 1, the balls BB outside of the recesses 105 (the released balls) may be placed on the rolling face 103b. Thereby, the released balls may move on the rolling face 103b by centrifugal force and gravitational force applied to the released balls as the rotation speed of the rotator varies within a range less than the rotation speed ω 1. Therefore, distribution of the released balls in a peripheral direction of the race member 10 may be possible. Accordingly, the balls BB outside of the recesses 105 (the released balls) may easily move to the recesses 105 in which no balls BB are detained, which may increase a detention rate of the balls BB in the recesses 105. As a result, aggravation of unbalance due to the released balls may be reduced.

Figure 5:
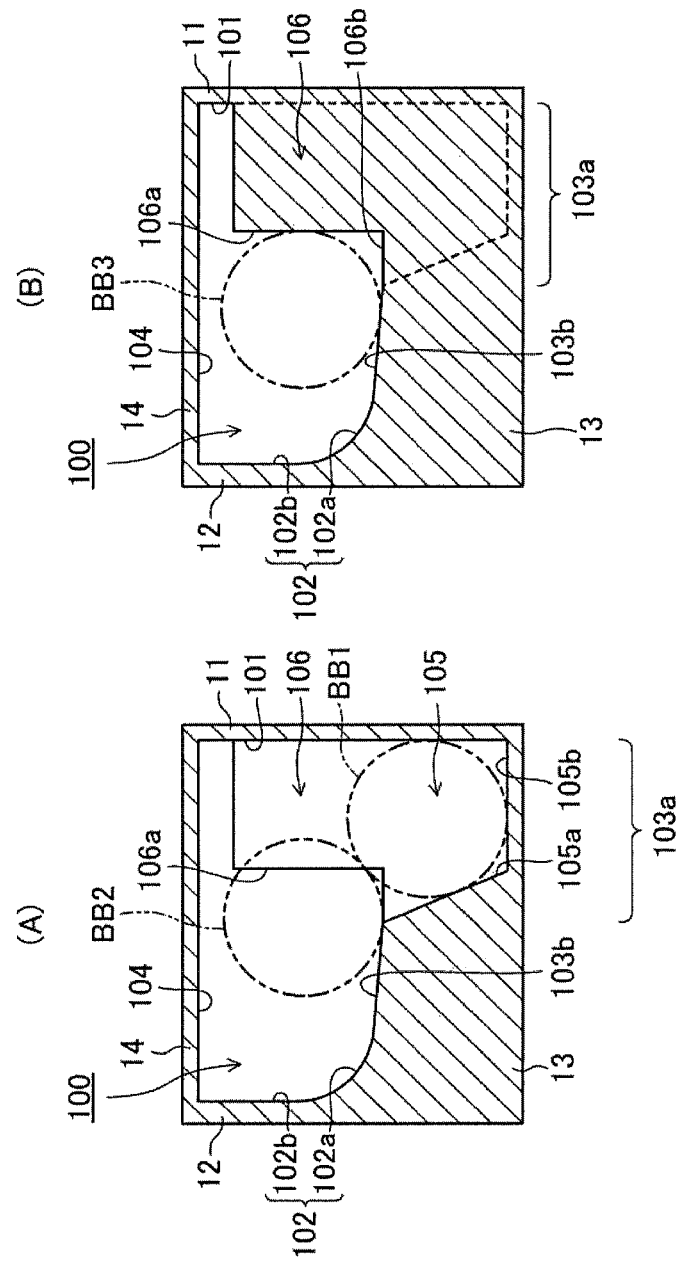
FIG. 5 is a fragmentary sectional view illustrating a configuration of the ball balancer.
Figure 11:
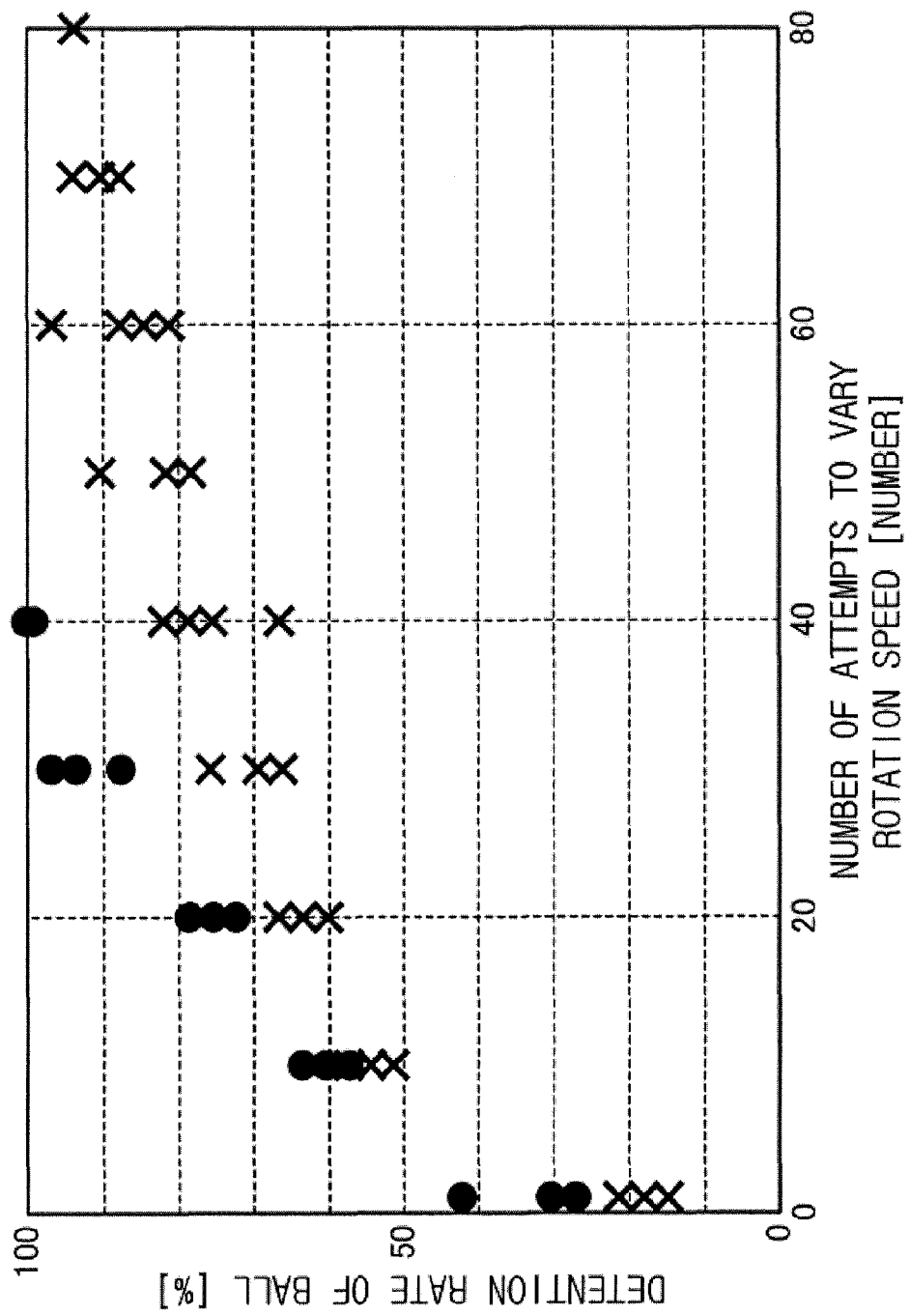
FIG. 11 is a graph explaining a detention rate of balls.

Now, increase of the detention rate of the balls will be described with reference to FIG. 11. FIG. 11 illustrates a relationship between the number of attempts to vary the rotation speed of the rotator and the detention rate of balls at ball detention positions. In FIG. 11, '●' represents measured results of the case in which the configuration illustrated in FIGS. 3 to 5 is formed throughout the periphery of the race member 10 (i.e. the ball balancer 1 of the present embodiment), and 'X' represents measured results of the case in which the protrusions 106 are not provided at the race member 10 (i.e. the case in which the flat planes 106b respectively extend from the inner peripheral edge of the rolling face 103b to the inner surface 101 of the inner peripheral wall 11. As illustrated in FIG. 11, forming the configuration illustrated in FIGS. 3 to 5 throughout the periphery of the face member 10 may increase the detention rate of balls as compared to the case of providing the race member 10 with the protrusions 106.

Also, when configuring the protrusion 106 such that the released ball BB3 comes into contact with a portion of the protrusion side surface 106a except for the edge thereof (corners of the protrusion 106), rolling resistance of the released ball BB3 may be reduced as compared to the case in which the released ball BB3 comes into contact with the edge of the protrusion side surface 106a. This enables easier distribution of the released balls in a peripheral direction of the race member 10, resulting in an increased detention rate of balls.

By configuring the outer peripheral edges of the recess side surface 105a and the recess bottom surface 105b to take the form of an arc (in particular, the form of an arc about the rotation axis) when viewed from the top of the race member 10, easier entry of the balls BB into the recesses 105 may be accomplished. This may result in a more increased detention rate of the balls.

Moreover, by configuring the protrusion side surface 106a to take the form of an arc (in particular, the form of an arc about the rotation axis) when viewed from the top of the race member 10, easier distribution of the released balls in a peripheral direction of the race member 10 may be accomplished. This may result in a more increased detention rate of the balls.

Other Embodiments

Although the aforementioned embodiments describe the ball balancer as being installed to the rotating tub of the washing machine by way of example, the ball balancer may be installed to rotators of rotary machines (rotators rotatable about a rotation axis), such as a centrifuge or a disc drive.

Additionally, the aforementioned embodiments are given as exemplary embodiments, and are not intended to limit the scope of the disclosure, applications and use purposes.

As is apparent from the above description, the aforementioned ball balancer may increase a detention rate of balls in ball detention portions and reduce aggravation of unbalance due to released balls outside of the ball detention portions, and is applicable to rotary machines such as a washing machine, a centrifuge, and a disc drive.

Although the embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A ball balancer installed to a rotator that is rotatable about a rotation axis, the ball balancer comprising:
a doughnut-shaped race member having an empty space therein; and
a plurality of balls movably received in the empty space of the race member,
wherein the empty space of the race member is defined by inner and outer peripheral walls in the form of a circular pipe about the rotation axis, and doughnut-shaped bottom and top walls connecting upper and lower ends of the inner and outer peripheral walls to each other,
wherein an inner surface of the bottom wall is configured by an inner peripheral edge portion connected to the inner peripheral wall and a rolling face connecting the inner peripheral edge portion and the outer peripheral wall to each other,
wherein the inner peripheral edge portion of the inner surface of the bottom wall is provided with a plurality of ball detention portions spaced apart from one another by a predetermined distance in a peripheral direction of the race member and a plurality of anti-separation portions alternately arranged between the plurality of ball detention portions in the peripheral direction of the race member,
wherein each of the plurality of anti-separation portions is connected to the inner surface of the inner peripheral wall of the race member and the inner peripheral edge portion of the inner surface of the bottom wall of the race member,
wherein the rolling face is inclined upward from the inner peripheral edge portion of the inner surface of the bottom wall to the outer peripheral wall to allow the balls to move to the outer peripheral wall by centrifugal force applied to the balls when a rotation speed of the rotator is greater than a second rotation speed that is less than a first rotation speed causing primary resonance,
wherein each of the ball detention portions is configured, when the rotation speed of the rotator is less than the first rotation speed, to allow one of the balls moved from the rolling face to the ball detention portion to be detained in the ball detention portion and to allow the detained ball in the ball detention portion to come into contact with a released one of the balls outside of the ball detention portion so as to prevent separation of the released ball from the rolling face, and is also configured, when the rotation speed of the rotator is greater than the first rotation speed, to allow the detained ball in the ball detention portion to be separated to the rolling face by centrifugal force applied to the detained ball, and
wherein each of the plurality of anti-separation portions is configured to come into contact with the released ball outside of the ball detention portion when the rotation speed of the rotator is less than the first rotation speed, so as to prevent separation of the released ball from the rolling face.

2. The ball balancer according to claim 1, wherein the plurality of ball detention portions is respectively configured by a plurality of recesses.

3. The ball balancer according to claim 2,
wherein a radial outer side surface of each of the plurality of recesses is inclined upward from the bottom of the recess to an inner peripheral edge of the rolling face by a steeper angle than the rolling face, to allow the ball in the recess to move on the radial outer side surface of the recess and be separated to the rolling face by centrifugal force applied to the ball when the rotation speed of the rotator is greater than the first rotation speed, and
wherein a depth of each of the plurality of recesses is determined to ensure that the released ball outside of the recess comes into contact with both the rolling face and the detained ball in the recess.

4. The ball balancer according to claim 3, wherein the depth of each of the plurality of recesses is determined to ensure that an upper end of the detained ball in the recess protrudes from the recess and the released ball outside of the recess comes into contact with the detained ball at a position higher than an upper end of the recess.

5. The ball balancer according to claim 4, wherein the plurality of anti-separation portions is respectively configured by a plurality of protrusions.

6. The ball balancer according to claim 5, wherein each of the plurality of protrusions is configured to allow the released ball to come into contact with both the rolling face and a radial outer side surface of the protrusion.

7. The ball balancer according to claim 6, wherein a radial distance from the inner peripheral edge of the rolling face to the radial outer side surface of each of the plurality of protrusions is less than a radius of the ball.

8. A washing machine comprising:
a ball balancer according to any one of claims 1 to 7; and
a wash tub to which the ball balancer is installed, the wash tub being rotatable about a rotation axis.

9. The ball balancer according to claim 6 or 7, wherein each of the plurality of protrusions is configured to allow the released ball to come into contact with a portion of the radial outer side surface of the protrusion except for the edge thereof.

10. A washing machine comprising:
a ball balancer according to claim 8; and
a wash tub to which the ball balancer is installed, the wash tub being rotatable about a rotation axis.

11. The ball balancer according to claim 9, wherein a width of the radial outer side surface of each of the plurality of protrusions with respect to the rotation axis is greater than the radius of the ball.

12. A washing machine comprising:
a ball balancer according to claim 11; and
a wash tub to which the ball balancer is installed, the wash tub being rotatable about a rotation axis.

13. The ball balancer according to claim 11, wherein the rotator is switchable between a high-speed rotation mode in which the rotator is rotated at a rotation speed greater than the first rotation speed and a variable-speed rotation mode in which the rotation speed varies within a range less than the first rotation speed.

14. A washing machine comprising:
a ball balancer according to claim 13; and
a wash tub to which the ball balancer is installed, the wash tub being rotatable about a rotation axis.

* * * * *